US012801890B2

(12) United States Patent
Shafipour et al.

(10) Patent No.: US 12,801,890 B2
(45) Date of Patent: Nov. 17, 2026

(54) SPARSITY AND QUANTIZATION FOR DEEP NEURAL NETWORKS

(71) Applicant: Microsoft Technology Licensing, LLC, Redmond, WA (US)

(72) Inventors: Rasoul Shafipour, Bellevue, WA (US); Bita Darvish Rouhani, Bellevue, WA (US); Douglas Christopher Burger, Bellevue, WA (US); Ming Gang Liu, Kirkland, WA (US); Eric S Chung, Woodinville, WA (US); Ritchie Zhao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1017 days.

(21) Appl. No.: 17/664,616

(22) Filed: May 23, 2022

(65) Prior Publication Data

US 2023/0316039 A1 Oct. 5, 2023

Related U.S. Application Data

(60) Provisional application No. 63/362,453, filed on Apr. 4, 2022.

(51) Int. Cl.
*G06N 3/04* (2023.01)
*G06N 5/04* (2023.01)

(52) U.S. Cl.
CPC ................. *G06N 3/04* (2013.01); *G06N 5/04* (2013.01)

(58) Field of Classification Search
CPC ........... G06N 3/04; G06N 5/04; G06N 3/0495
See application file for complete search history.

(56) References Cited

U.S. PATENT DOCUMENTS

2017/0054449 A1* 2/2017 Mani ..................... G01S 13/931
2019/0042944 A1* 2/2019 Nair ....................... G06N 3/045
(Continued)

FOREIGN PATENT DOCUMENTS

WO WO-2021062029 A1 * 4/2021 ............. G06N 3/047

OTHER PUBLICATIONS

"IEEE Standard for Floating-Point Arithmetic," in IEEE Std 754-2019 (Revision of IEEE 754-2008), pp. 18 & 23, Jul. 22, 2019, doi: 10.1109/IEEESTD.2019.8766229. (Year: 2019).*
(Continued)

*Primary Examiner* — Chau T Nguyen
*Assistant Examiner* — Harrison C Kim
(74) *Attorney, Agent, or Firm* — Alleman Hall LLP

(57) ABSTRACT

A computing system is configured to implement a deep neural network comprising an input layer for receiving inputs applied to the deep neural network, an output layer for outputting inferences based on the received inputs, and a plurality of hidden layers interposed between the input layer and the output layer. A plurality of nodes selectively operate on the inputs to generate and cause outputting of the inferences, wherein operation of the nodes is controlled based on parameters of the deep neural network. A sparsity controller is configured to selectively apply a plurality of different sparsity states to control parameter density of the deep neural network. A quantization controller is configured to selectively quantize the parameters of the deep neural network in a manner that is sparsity-dependent, such that quantization applied to each parameter is based on which of the plurality of different sparsity states applies to the parameter.

20 Claims, 11 Drawing Sheets

(56) References Cited

U.S. PATENT DOCUMENTS

| | | | | |
|---|---|---|---|---|
| 2019/0108436 A1* | 4/2019 | David | .................... | G06N 3/045 |
| 2022/0067527 A1* | 3/2022 | Xu | .......................... | G06N 3/063 |
| 2022/0335280 A1* | 10/2022 | Kim | .................... | G06F 11/3062 |

OTHER PUBLICATIONS

Vasquez, K., Venkatesha, Y., Bhattacharjee, A., Moitra, A., & Panda, P. (Feb. 2021). Activation density based mixed-precision quantization for energy efficient neural networks. In 2021 Design, Automation & Test in Europe Conference & Exhibition (DATE) (pp. 1360-1365). IEEE. (Year: 2021).*

Yang, Q., Mao, J., Wang, Z., & Li, H. (2019, November). DASNet: Dynamic activation sparsity for neural network efficiency improvement. In 2019 IEEE 31st International Conference on Tools with Artificial Intelligence (ICTAI) (pp. 1401-1405). IEEE. (Year: 2019).*

Yu, P., Wu, S., Klopp, J.P., Chen, L., & Chien, S. (2020). Joint Pruning & Quantization for Extremely Sparse Neural Networks. ArXiv, abs/2010.01892. (Year: 2020).*

Boo, et al., "Structured Sparse Ternary Weight Coding of Deep Neural Networks for Efficient Hardware Implementations", In Proceedings of IEEE International Workshop on Signal Processing Systems, Oct. 3, 2017, 6 Pages.

Drumond, et al., "Training DNNs with Hybrid Block Floating Point", In Repository of arxiv code:1804.01526v1, Apr. 4, 2018, 9 Pages.

Han, et al., "Deep Compression: Compressing Deep Neural Networks with Pruning, Trained Quantization and Huffman Coding", In Repository of arXiv:1510.00149v5, Feb. 15, 2016, 14 Pages.

Liang, et al., "Pruning and Quantization for Deep Neural Network Acceleration: A survey", In Journal of Neurocomputing, Jul. 21, 2021, pp. 370-403.

"International Search Report and Written Opinion issued in PCT Application No. PCT/US2023/010976", Mailed Date: Apr. 18, 2023, 14 Pages.

Weng, O, "Neural Network Quantization for Efficient Inference: A Survey", In Repository of arXiv:preprint arXiv:2112.06126, Dec. 8, 2021, 13 Pages.

* cited by examiner

606

| Mantissa | Sparsity | Stored Mantissa | Inferred Mantissa |
|---|---|---|---|
| 1.0 | 1 | .0 | 1.0 |
| 1.1 | 1 | .1 | 1.1 |
| 1.0 | 0 | 0 | 0 |
| 1.1 | 0 | .1 | 0.1 |

608

| Mantissa | Sparsity | Stored Mantissa | Inferred Mantissa |
|---|---|---|---|
| 1.0 | 1 | .0 | 1.0 |
| 1.1 | 1 | .1 | 1.1 |
| 1.0 | 0 | X | 0 |
| 1.1 | 0 | X | 0 |

FIG. 6C

SPARSITY AND QUANTIZATION FOR DEEP NEURAL NETWORKS

CROSS REFERENCE TO RELATED APPLICATIONS

This application claims priority to U.S. Provisional Patent Application Ser. No. 63/362,453, filed Apr. 4, 2022, the entirety of which is hereby incorporated herein by reference for all purposes.

BACKGROUND

A deep neural network can include an input layer configured to receive inputs to the network, an output layer configured to output inferences based on the inputs, and a plurality of hidden layers interposed between the input and output layers. Operation of the deep neural network is controlled by a plurality of nodes disposed within the layers of the network. Each node is associated with one or more parameters, which control operation of the node. Thus, storing a deep neural network can include storing a large number (e.g., millions, billions) of different node parameters.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computing system is configured to implement a deep neural network comprising an input layer for receiving inputs applied to the deep neural network, an output layer for outputting inferences based on the received inputs, and a plurality of hidden layers interposed between the input layer and the output layer. A plurality of nodes selectively operate on the inputs to generate and cause outputting of the inferences, wherein operation of the nodes is controlled based on parameters of the deep neural network. A sparsity controller is configured to selectively apply a plurality of different sparsity states to control parameter density of the deep neural network. A quantization controller is configured to selectively quantize the parameters of the deep neural network in a manner that is sparsity-dependent, such that quantization applied to each parameter is based on which of the plurality of different sparsity states applies to the parameter.

BRIEF DESCRIPTION OF THE DRAWINGS

FIGS. 6A-6C schematically illustrate controlling a selectively variable quantization function based on a sparsity state of a deep neural network.

DETAILED DESCRIPTION

As deep neural networks (DNNs) dramatically increase in number of parameters, the compute and memory requirements for training those networks also increase. This can cause the training process to become slow and computationally expensive. Sparsifying over-parameterized DNNs is a common technique to reduce the compute and memory footprint during inference time. By removing 50%, 75%, 87.5% or more of each tensor in some, most, or all layers, the total amount of memory accesses and compute may be reduced accordingly.

The present disclosure is directed to techniques for selectively quantizing parameters of a DNN based on which of a plurality of different sparsity states applies to the parameter. As used herein, "quantization" generally refers to removing one or more bits or digits used to represent a given piece of information—e.g., to conserve memory. For example, as will be described in more detail below, an indication as to whether a given parameter is sparsified can be used to infer one or more bits associated with a parameter (e.g., a bit used to encode part of a mantissa of a node weighting), allowing those bits to be inferred while reducing memory requirements of the DNN. Furthermore, the techniques used herein may be applied to compressed communication between multiple nodes in a distributed computing scenario, enabling more information to be transmitted between the multiple nodes while using the same amount of network bandwidth.

More generally, a sparsity controller may be used to selectively apply to the DNN a plurality of different sparsity states to control parameter density of the DNN. This can include sparsifying some parameters and not others (e.g., a first sparsity state is used for some parameters and a second sparsity state is used for other parameters), changing the number of parameters in the DNN that are sparsified, and/or changing how the system selects which parameters to sparsify. Based on the sparsity state currently applied to any particular parameter of the DNN, a quantization controller may selectively quantize the parameter in a manner that is sparsity-dependent—e.g., information about the parameters is inferred differently in a first sparsity state than a second sparsity state. This can beneficially be used to reduce the amount of data used to encode the parameters of the DNN, and/or increase the precision with which the parameters are encoded without increasing memory requirements. The techniques described herein may beneficially be used to reduce the memory footprint and accelerate computation associated with implementing a DNN, and/or to improve data exchange between nodes of a distributed computing system without consuming more bandwidth.

Figure 1:
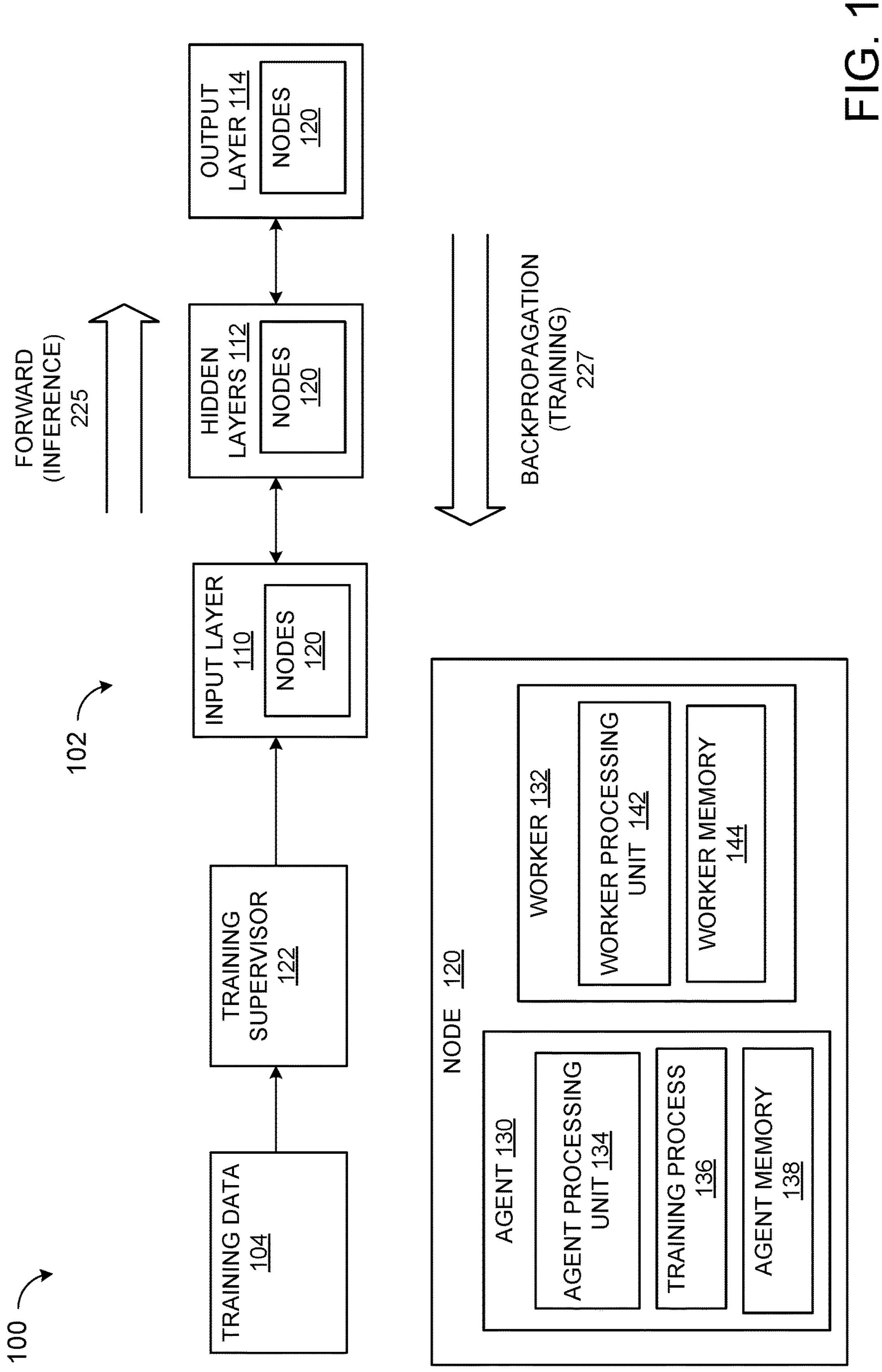
FIG. 1 schematically shows an example system for training a neural network.

FIG. 1 shows an example system 100 for training of a neural network 102. System 100 may be implemented as any suitable computing system of one or more computing devices. In some examples, system 100 may be implemented as computing system 1000 described below with respect to FIG. 10.

In this example, training data 104 is used to train parameters of neural network 102, such as the weights and/or gradients of neural network 102. Training data 104 may be processed over multiple iterations to arrive at a final trained set of model parameters.

Neural network 102 includes an input layer 110 for receiving inputs applied to the DNN, an output layer 114 for outputting inferences associated with and based on the received inputs, and a plurality of hidden layers 112 interposed between the input layer and the output layer. Each layer includes a plurality of nodes 120, where the nodes are disposed within and interconnect the input layer, output layer, and hidden layers. The nodes selectively operate on the inputs to generate and cause outputting of the inferences, and operation of the nodes is controlled based on trained parameters of the DNN.

Training supervisor 122 may provide training data 104 to the input layer 110 of neural network 102. In some examples, training data 104 may be divided into minibatches and/or shards for distribution to subsets of inputs. Training supervisor 122 may include one or more network accessible computing devices programmed to provide a service that is responsible for managing resources for training jobs. Training supervisor 122 may further provide information and instructions regarding the training process to each node 120.

In this example, nodes 120 of the model receive input values on input layer 110 and produce an output result on output layer 114 during forward processing, or inference (125). During training, the data flows in the reverse direction during backpropagation (127), where an error between a network result and an expected result is determined at the output and the weights are updated layer by layer flowing from output layer 114 to input layer 110.

Each node 120 may include one or more agents 130 configured to supervise one or more workers 132. In general, each node 120 includes multiple workers 132, and an agent 130 may monitor multiple workers. Each node may further include multiple agents 130. Nodes 120 may be implemented using a central processing unit (CPU), a GPU, a combination of CPUs and GPUs, or a combination of any CPUs, GPUs, ASICs, and/or other computer programmable hardware. Agents 130 and workers 132 within a common node 120 may share certain resources, such as one or more local networks, storage subsystems, local services, etc.

Each agent 130 may include an agent processing unit 134, a training process 136, and an agent memory 138. Each worker 132 may include a worker processing unit 142 and a worker memory 144. Generally, agent processing units 134 are described as being implemented with CPUs, while worker processing units 142 are implemented with GPUs. However other configurations are possible. For example, some or all aspects may additionally or alternatively be implemented in cloud computing environments. Cloud computing environments may include models for enabling on-demand network access to a shared pool of configurable computing resources. Such a shared pool of configurable computing resources can be rapidly provisioned via virtualization, then scaled accordingly. A cloud computing model can be composed of various characteristics such as, for example, on-demand self-service, broad network access, resource pooling, rapid elasticity, measured service, and so forth.

Deep learning models (or "networks") comprise a graph of parameterizable layers (or "operators") that together implement a complex nonlinear function. The network may be trained via a set of training data that comprises of pairs of input examples (x) and outputs (y). The desired output is a learned function that is parameterized by weights (w), such that given an input (x), the prediction $f$ (x; w) approaches (y).

Applying the function $f$ (x; w) is performed by transforming the input (x) layer by layer to generate the output—this process is called inference. In a training setting, this is referred to as the forward pass. Provisioning a network to solve a specific task includes two phases—designing the network structure and training the network's weights. Once designed, the network structure is generally not changed during the training process.

Training iterations start with a forward pass, which is similar to inference but wherein the inputs of each layer are stored. The quality of the result $f$ (x; w) of the forward pass is evaluated using a loss function l to estimate the accuracy of the prediction. The following backward pass propagates the loss (e.g., error) from the last layer in the reverse direction. At each parametric (e.g., learnable) layer, the backward pass uses the adjoint of the forward operation to compute a gradient g and update the parameters, or weights using a learning rule to decrease l. This process is repeated iteratively for numerous examples until the function $f$ (x; w) provides the desired accuracy.

Figure 2:
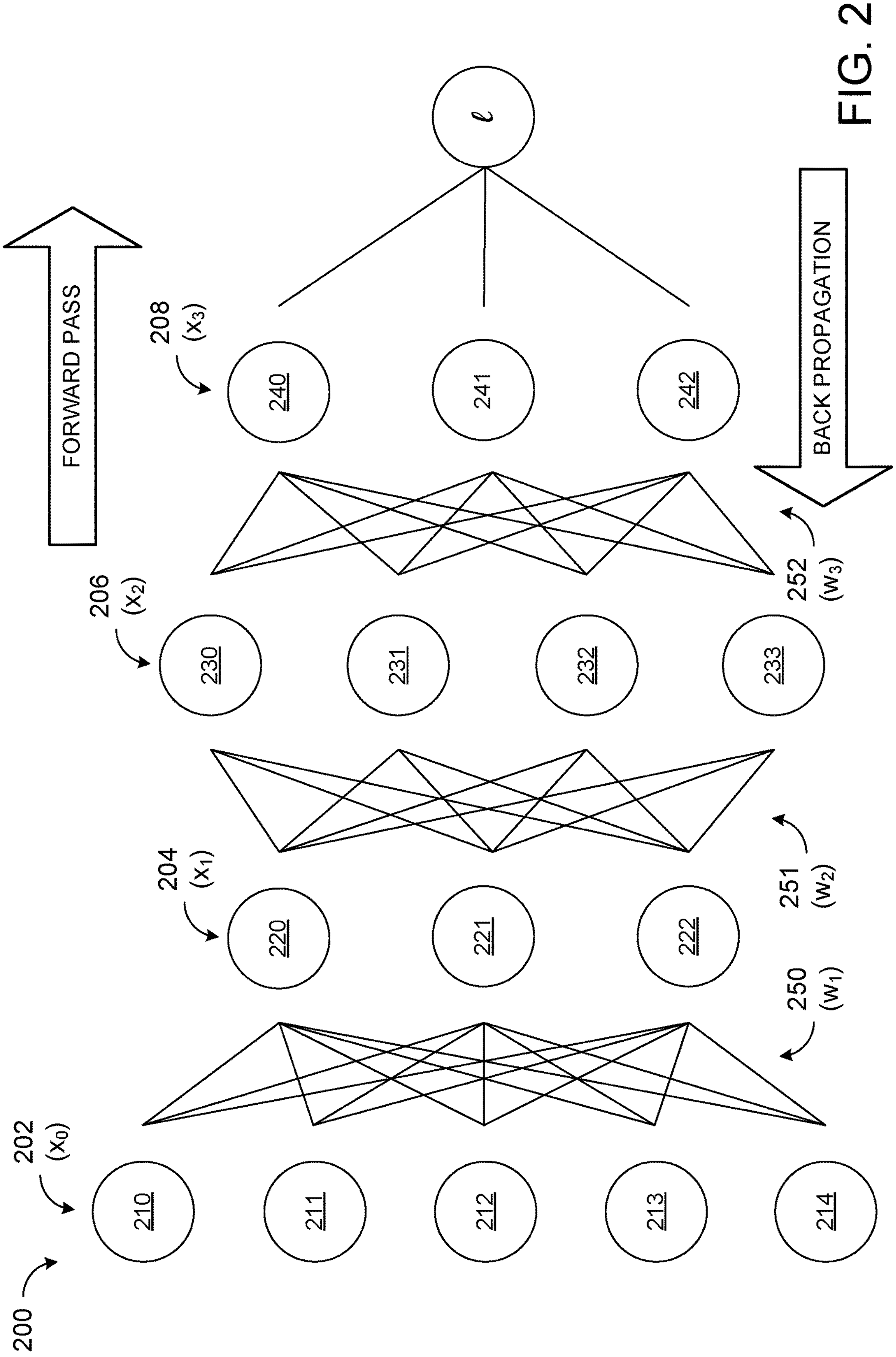
FIG. 2 schematically shows an example of dense training of a neural network.

As an example, FIG. 2 schematically shows a multilayer neural network 200, including an input layer ($x_0$) 202, two hidden layers ($x_1$) 204 and ($x_2$) 206, and an output layer ($x_3$) 208. In this example, input layer 202 includes 5 neurons (210, 211, 212, 213, 214), first hidden layer 204 includes 3 neurons (220, 221, 222), second hidden layer 206 includes 4 neurons (230, 231, 232, 233), and output layer 208 incudes 3 neurons (241, 242, 243).

Neural network 200 includes activation functions, such as rectified linear units (not shown). Neural network 200 may be parameterized by weight matrices $w_1$ 250, $w_2$ 251, and $w_3$ 252 and bias vectors (not shown). Each weight matrix includes a weight for each connection between two adjacent layers. The forward pass may include a series of matrix-vector products $f$ (x0; w), where $x_0$ is the input or feature vector.

The sizes of deep neural networks such as network 200 are rapidly outgrowing the capacity of hardware to fast store and train them. Sparsity may be applied to reduce the number of network parameters before, during, and after training by pruning edges from the underlying topology. Removing neurons or input features in this way corresponds to removing rows or columns in the layer weight matrices. Removing individual weights corresponds to removing individual elements of the weight matrices. Sparsity may be induced or arise naturally, and may be applied to other tensors and matrices, such as matrices for activation, error, biases, etc.

For activations, shutting off an activation for a node essentially generates a zero output. Sparsity as applied to activations works the same, e.g., activations that are a higher magnitude are of higher value to the network and are retained. In some examples, the activations approach sparsity naturally, so true sparsity can be added with modest impact.

Sparsifying a weight matrix, or other matrix or tensor effectively reduces the complexity of matrix multiplication events utilizing that matrix. Speed of matrix multiplication directly correlates to the sparsity of the matrix. To gain a certain level of efficiency, and thus an increase in processing speed, the sparsity may be distributed between the two inputs of a matmul. Applying 75% sparsity to a first matrix and 0% sparsity for a second matrix speeds up the process on the order of 4×. Another way to accomplish 4× speed increase is by applying 50% sparsity to the first matrix and 50% sparsity to a second matrix. A balance can thus be made by distributing sparsity between weights and activations, between errors and activations, or to any two input matrices in a matmul operation. The use of regularization and boosting techniques may be used during training to distribute the information across different blocks.

Figure 3:
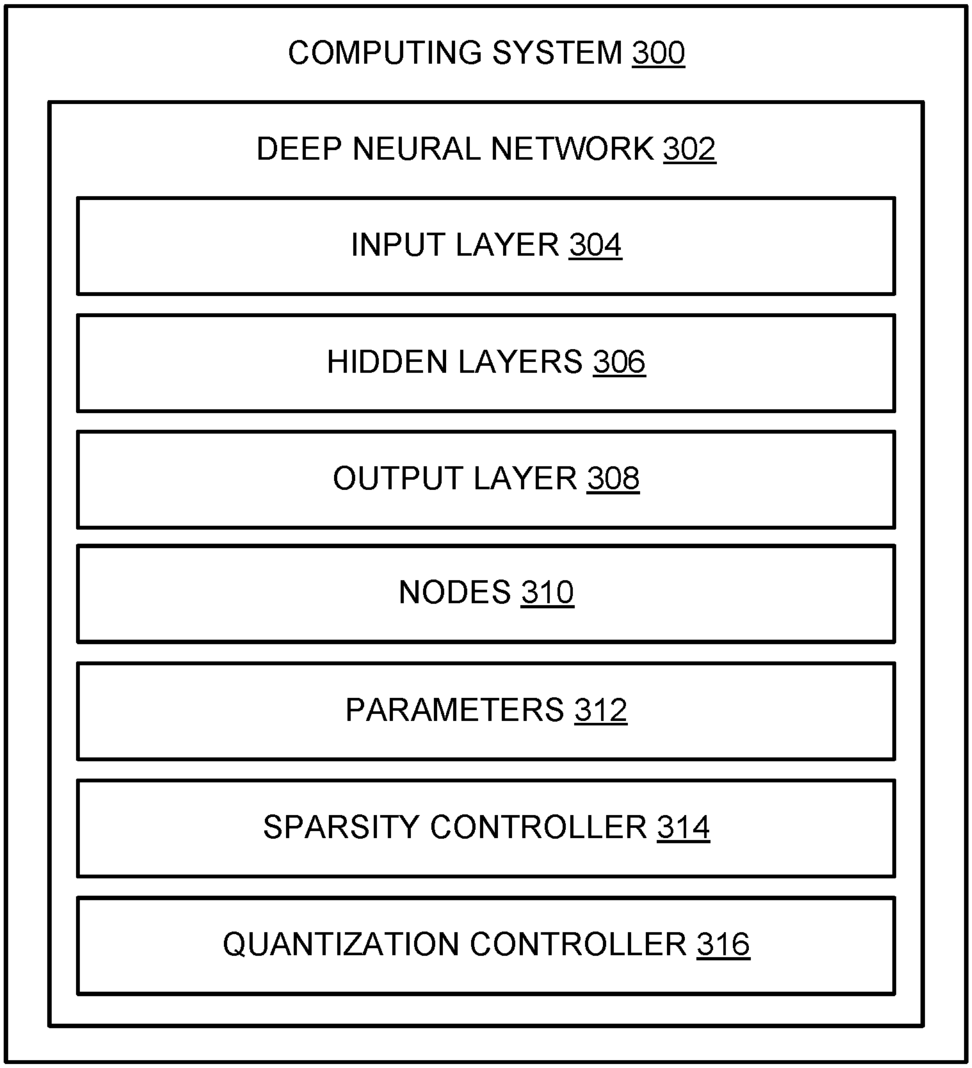
FIG. 3 schematically illustrates an example computing system implementing a deep neural network.

FIG. 3 schematically illustrates an example computing system 300 that may be useable to implement a DNN and perform any or all of the sparsity and quantization techniques described herein. Computing system 300 may be implemented by any number of different computing devices, which each may have any suitable capabilities, hardware configurations, and form factors. In cases where two or more different computing devices cooperatively implement computing system 300, such devices may in some cases communicate remotely over a computer network (e.g., in a cloud computing scenario). In some cases, computing system 300 may be implemented as computing system 1000 described below with respect to FIG. 10.

In FIG. 3, computing system 300 implements a DNN 302, which may take any suitable form—e.g., multilayer neural network 200 of FIG. 2 is one non-limiting example illustration. As discussed above, the neural network includes an input layer 304 for receiving inputs applied to the deep neural network, an output layer 308 for outputting inferences associated with and based on the received inputs, and a plurality of hidden layers 306 interposed between the input layer and the output layer.

As discussed above, the DNN further includes a plurality of nodes disposed within and interconnecting the input layer, output layer, and hidden layers, wherein the nodes selectively operate on the inputs to generate and cause outputting of the inferences, and wherein operation of the nodes is controlled based on parameters of the DNN. In FIG. 3, DNN 302 stores a plurality of nodes 310, where operation of the nodes is controlled based on parameters 312.

As used herein, "parameters" may refer to any suitable data that affects operation of nodes in a deep neural network. As non-limiting examples, parameters can refer to weights, activations/activation functions, gradients, error values, biases, etc. The present disclosure primarily focuses on parameters taking the form of weights, although it will be understood that this is non-limiting. Rather, the sparsity and quantization techniques described herein may be applied to any suitable parameters of a deep neural network.

In FIG. 3, the deep neural network further comprises a sparsity controller 314. The sparsity controller is configured to selectively apply a plurality of different sparsity states to control parameter density of the deep neural network. As will be described in more detail below, the sparsity controller may work in tandem with a quantization controller 316 configured to selectively quantize parameters of the deep neural network in a manner that is sparsity-dependent.

Figure 4:
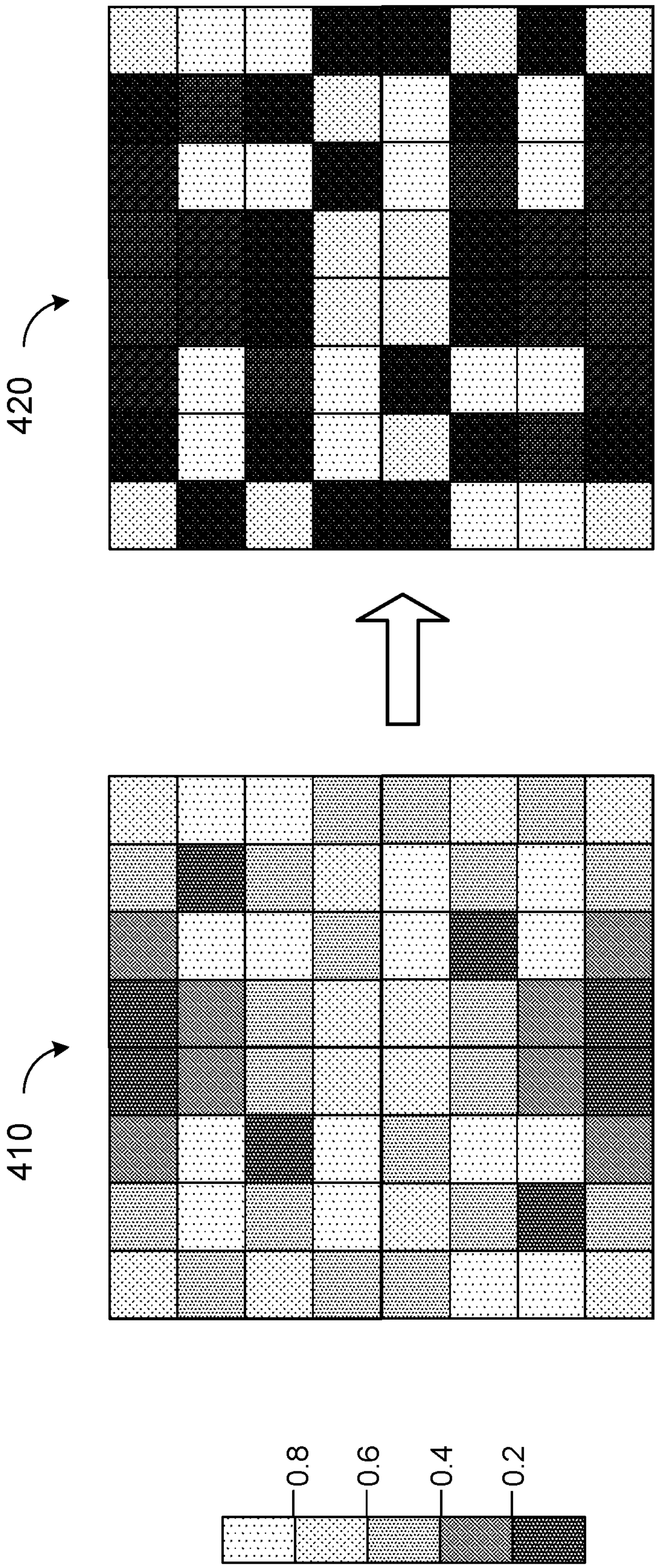
FIG. 4 schematically illustrates simple matrix sparsification.

In some cases, the sparsity state of any given parameter of the deep neural network may be represented by a sparsity mask applied to a two-dimensional parameter matrix. For example, in FIG. 4, a heat map 410 of an 8×8 weight matrix that is going to be sparsified is shown. Lighter shaded blocks represent higher values. A simple high pass filter may be applied to take the highest values to form a sparsified matrix 420. The sparsified matrix may be used to derive a sparsity mask—e.g., a binary mask specifying which parameters (e.g., of a given parameter tensor) are sparsified. To use the example of matrix 420, a sparsity mask may specify that some parameters (e.g., those colored black) are sparse, while other parameters (e.g., those still using shaded fill patterns in matrix 420) are not sparse. In various examples, a sparsity mask can be prescribed or dynamic (e.g., ephemeral or induced).

It will be understood that sparsity may be applied to parameters of a DNN in various suitable ways. For unstructured sparsity, the mask has few constraints, and can essentially be configured in any random pattern. Unstructured sparsity is typically applied after a network is trained but can also be applied during training in some circumstances. Unstructured sparsity is the least constraining form of sparsity, but its inherent randomicity can make it more difficult to accelerate on the hardware level.

An alternative approach that provides balanced sparsity is referred to as N of M constraints. Therein, for a column or row that has M values, only N (N<M) can be non-zero. Balanced sparsity is thus more constrained than unstructured sparsity, but is easier to accelerate with hardware because the hardware can anticipate what to expect from each constrained row or column. The known constraints can be pre-loaded into the hardware. The optimal configurations for applying balanced sparsity may be based on both the complexity of the artificial intelligence application and specifics of the underlying hardware. Balanced sparsity does not, in and of itself, restrict the small-world properties of the weights after convergence.

Figure 5:
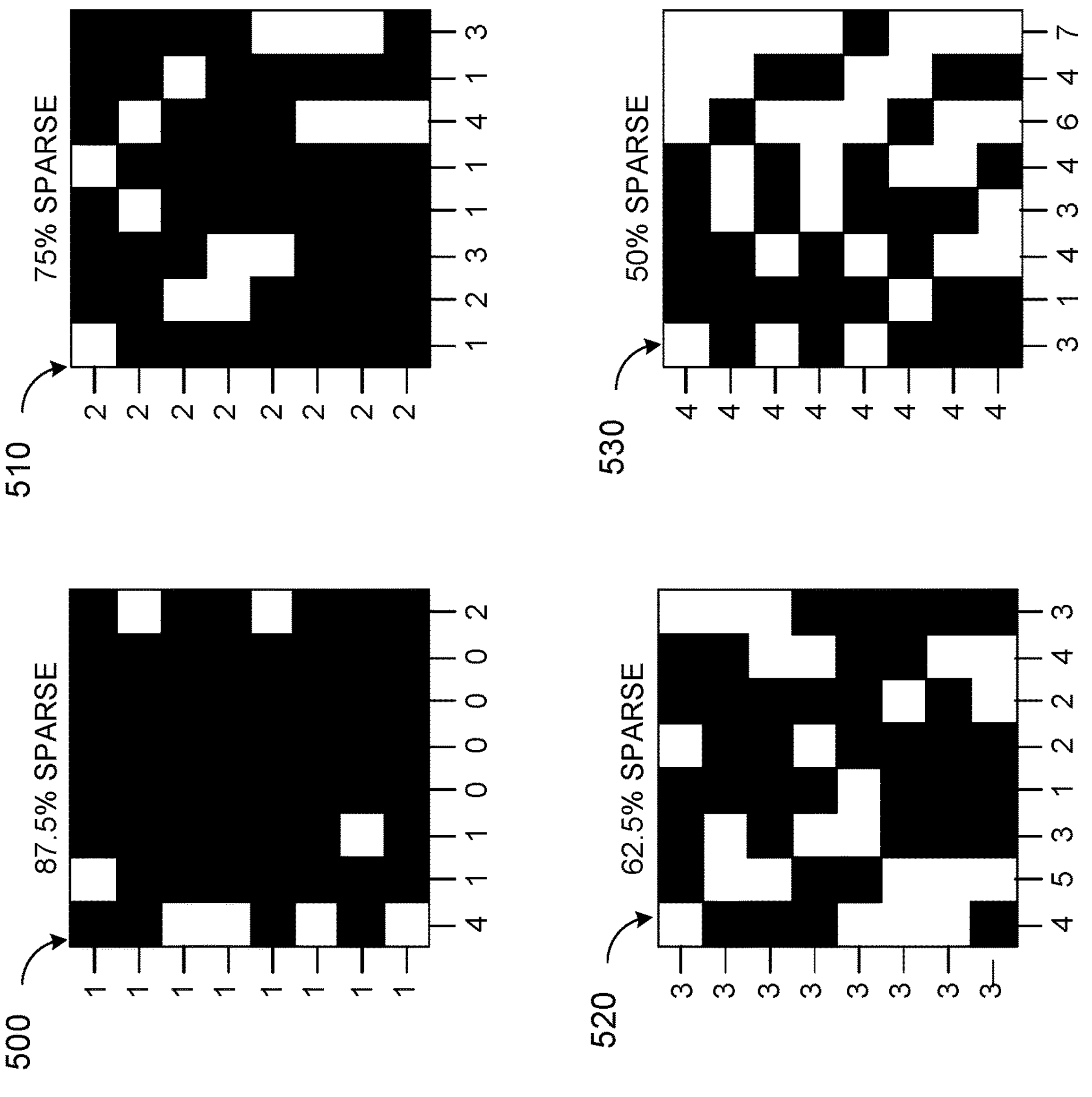
FIG. 5 schematically shows sparsity masks with varying degrees of sparsity.

Further, balanced sparsity is scalable to different sparsity levels. As an example, FIG. 5 shows balanced sparsity masks of size M=8×8. Mask 500 has an N of 1 along rows, yielding a mask with 87.5% sparsity—e.g., along each row, 1 parameter is not sparse. In FIG. 5, numbers adjacent to each row/column of the mask indicate how many parameters within each row/column are not sparse. Mask 510 has an N of 2 along rows, yielding a mask with 75% sparsity. Mask 520 has an N of 3 along rows, yielding a mask with 50% sparsity. Mask 530 has an N of 4 along rows, yielding a mask with 50% sparsity. Balanced sparsity can be applied to weights, activations, errors, and gradients and may also have a scalable impact on training through selecting which tensors to sparsify. It will be understood that these different sparsity levels are non-limiting examples—in general, the level of sparsity can take any value greater than 0%.

In any case, it will be understood that different sparsity states may be applied to the deep neural network. As one example, a "sparsity state" can refer to whether an individual parameter of the neural network is sparsified. As such, in the context of a single parameter, a "first sparsity state" of the plurality of different sparsity states may cause sparsification of the parameter, while a second sparsity state of the plurality of different sparsity states does not cause sparsification of the parameter.

Additionally, or alternatively, different sparsity states may refer to the manner in which the overall network is sparsified—e.g., a first sparsity state may refer to unstructured sparsity, while a second sparsity state may refer to a suitable balanced sparsity approach. Additionally, or alternatively, different sparsity states may refer to the total number of different parameters that are sparsified—e.g., 75% sparse vs 50% sparse as is shown in FIG. 5. In other words, for a parameter tensor of the deep neural network, the first and second sparsity states may differ relative to a percentage of parameters that are sparsified in the parameter tensor. However, it will be understood that the examples provided above with respect to sparsity states are non-limiting, and that different "sparsity states" can refer to any suitable manner in which the sparsity applied to one or more parameters of a deep neural network can differ.

As discussed above, the computing system implementing the deep neural network may include a quantization controller configured to selectively quantize the parameters of the deep neural network in a manner that is sparsity-dependent—e.g., quantization controller 316 of FIG. 3. In other words, the quantization applied to each parameter may be based on which of the plurality of different sparsity states apply to the parameter. Among other things, selectively applying quantization may include making variable predictions about one or more aspects of a parameter that define, or are used to calculate, its value.

In general, as discussed above, selectively quantizing a given parameter may decrease a number of bits used to express that parameter, and in some cases, the applied quantization may vary depending on a sparsity state that applies to the parameter. For example, selectively quantizing a given parameter may include decreasing a number of bits used to express the parameter if it is sparsified. Thus, in one example, the first sparsity state may include any parameters of the neural network that are sparse, while the second sparsity state refers to parameters of the neural network that are not sparse. In this example, selectively quantizing parameters may include applying different operations to parameters in the first and second sparsity states to reduce the number of bits used to represent such parameters.

Figures 6A, 6B:
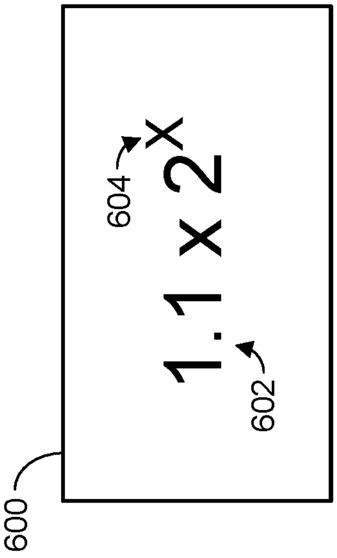

This scenario is illustrated in more detail with respect to FIGS. 6A and 6B. Specifically, FIG. 6A illustrates a highly-simplified and non-limiting example of a parameter 600 of a deep neural network. As shown, the parameter includes a mantissa (e.g., 1.1), which is multiplied by two to the power of some exponent 604 (represented as the letter “X”). Parameter 600 may be one of a large number (e.g., thousands, millions, billions) of different parameters associated with a deep neural network, and each parameter may be encoded by the computing system as some number of bits. For instance, the computing system may store some number of bits to encode a sign of the parameter (e.g., positive or negative), some number of bits to encode the mantissa 602 of the parameter, and some number of bits to encode the exponent 604 of the parameter. Thus, quantization may beneficially be used to reduce the number of bits used to store parameter 600. When aggregated over some to all of the parameters associated with the neural network, this can contribute to significant memory savings.

Specifically, FIG. 6B schematically illustrates selectively quantizing parameters of a neural network in a manner that is sparsity-dependent. Specifically, FIG. 6B depicts an example table 606, the first two columns of which include several example mantissas corresponding to different example parameters, and the sparsity states associated with the different parameters. As shown, the first two parameters in table 606 are non-sparse, indicated by the “1’ values shown in the sparsity column. The second two parameters in table 606 are sparse, indicated by the “0” values shown in the sparsity column. Sparsity values may in some cases be read from a sparsity mask as described above with respect to FIGS. 4 and 5.

Based on the different sparsity states of the different parameters, the quantization function may be used to reduce the number of bits used to encode the parameters. In FIG. 6B, the quantization function does this by making a mantissa bit determination that differs between the first and second sparsity states. More particularly, the quantization controller is configured to selectively infer at least some of the mantissa portion for a parameter based on whether the first sparsity state or the second sparsity state applies to the parameter.

This may include discarding a leading bit of the mantissa portion, as the leading bit can later be inferred based on whether the first sparsity state or the second sparsity state applies to the parameter. In other words, the quantization controller may selectively infer at least some of the mantissa portion for a parameter based on which of the plurality of different sparsity states applies to the parameter. More particularly, inferring at least some of the mantissa portion can include discarding a leading bit of the mantissa portion, and inferring the leading bit based on whether the first sparsity state or the second sparsity state applies to the parameter.

This is illustrated in FIG. 6B, in which table 606 includes additional columns listing the stored mantissa and inferred mantissa after the quantization function is applied. Specifically, in this example, selectively applying quantization includes discarding the leading bit for each mantissa. Thus, mantissa values of “1.1” are stored as “0.1” and mantissa values of “1.0” are stored as “0.0”. However, the quantization controller selectively infers the leading bits for each mantissa based on its corresponding sparsity state. If the parameter is non-sparse, the leading bit is inferred to be a “1” value, and if the parameter is sparse, the leading bit is inferred to be a “0” value. Thus, selectively quantizing parameters includes variably inferring the leading bit for each mantissa value, based on a sparsity state corresponding to the respective parameter.

In this manner, the system may accurately reproduce non-sparse mantissa values while reducing the number of bits used to encode such values. Specifically, in FIG. 6B, the first two mantissa values can be accurately recreated despite being their leading bits being discarded. While the second two mantissas are inferred as “0” and “0.1” rather than the original values of “1.0” and “1.1,” this may have little to no effect on the operation of the deep neural network, as the corresponding parameters are sparse.

It will be understood that the above scenario is only one non-limiting example. As another example, the quantization function may infer the leading mantissa bit of non-sparse parameters as “1” values, and infer the entire mantissa for sparse parameters as “0” values. This scenario is illustrated with respect to FIG. 6C, showing another table 608 in which quantization is applied to mantissa bits differently. Specifically, in this example, the leading mantissa bit for non-spare parameters is still inferred to be “1.” However, the entire mantissa for sparse parameters is inferred to be “0”— in other words, more than just the leading bit of the mantissa is discarded. The “X” values in FIG. 6C are used as generic placeholders. It will be understood that the system may store any suitable data to represent a mantissa portion of a sparse parameter, including no data at all.

Furthermore, though the disclosure has focused on mantissa values having only two bits, it will be understood that this is non-limiting. Rather, the techniques described herein may be used to quantize data encoded using any arbitrary number of bits, and such data may take other suitable forms besides mantissas associated with network parameters.

Furthermore, the above description focused primarily on a scenario where the different sparsity states refer to whether individual parameters are sparse or non-sparse. It will be understood that this is non-limiting. Rather, as discussed above, “sparsity states” can refer the percentage of parameters of any given parameter tensor that are sparse. Thus, for instance, the quantization function can be differently applied depending on whether a greater or smaller percentage of parameters in a parameter tensor are sparse. For example, in highly-sparse parameter tensors, relatively less quantization may be applied, as the high sparsity enables non-sparse parameters to be represented with more overall bits without increasing memory usage as compared to a scenario where no sparsity is applied.

The present disclosure has thus far focused on controlling quantization based at least in part on neural network sparsity. In some cases, this may be performed in tandem with additional memory conservation techniques to further reduce the memory usage (and/or improve the encoding precision) of different parameters of a DNN. As discussed above, at least some of the parameters of the deep neural network may be stored in a parameter tensor. In some cases, the parameter tensor may include separate exponent values for each parameter of the tensor—e.g., the exponent value for each parameter is stored in full in the parameter tensor, with no regard as to how similar or different the exponent values for each parameter may be.

Alternatively, however, at least a portion of the exponent value for two or more different parameters may be stored once, rather than replicated individually for each parameter. With reference to FIG. 7A, a plurality of different parameters 700 are schematically represented as sets of blocks. Each parameter includes a block 702 representing a sign portion of the parameter, a block 704 representing an exponent value associated with the parameter, and a block 706 representing a mantissa of the parameter. Each of the different portions of the parameter may be encoded by some number of computer bits. Thus, by reducing the number of bits used to encode portions of the parameter, the overall memory usage associated with implementing the DNN may beneficially be reduced.

Figure 7B:
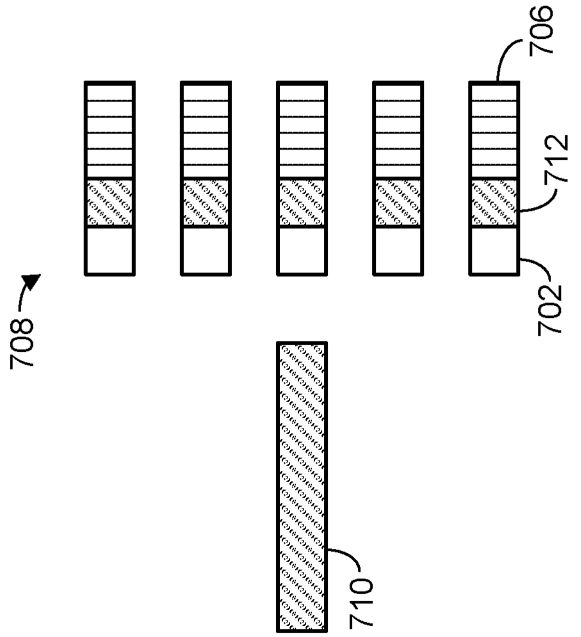
FIGS. 7A and 7B schematically illustrate storing of a shared exponent portion common to a plurality of parameters of a deep neural network.
Figure 7A:
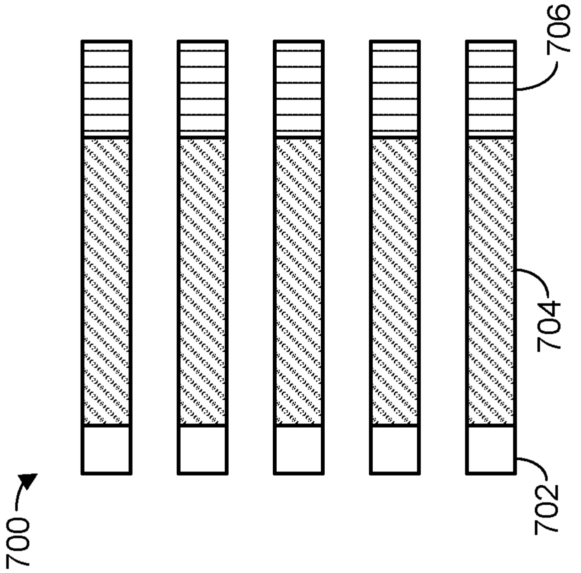

To this end, FIG. 7B schematically illustrates an alternate set of parameters 708, which may encode substantially the same information as parameters 700 while using less computer data. In particular, the system identifies a shared exponent portion 710 that may be common to each of the parameters, and need not be replicated in storage for each of the parameters. Each of the parameters 708 include blocks 712 representing a private exponent portion, which may express the extent to which the actual exponent value for that parameter differs from the shared exponent portion 710. In other words, the private exponent portion and shared exponent portion are useable to collectively specify an exponent value for a respective parameter. For example, the private exponent portion may specify an offset of the parameter's actual exponent value from the shared exponent portion, and this offset may be encoded using relatively fewer bits than individually encoding each parameter's full exponent value.

As discussed above, the parameters may be stored in any suitable way. In some cases, at least some of the parameters of the DNN may be stored in a parameter tensor. The parameter tensor may include (1) a mantissa portion for each parameter of the tensor (e.g., blocks 706), (2) a private exponent portion for each parameter of the tensor (e.g., blocks 712), and (3) a shared exponent portion. The shared exponent portion may be common to each of the parameters and need not be replicated in storage for each of the parameters, as described above.

Furthermore, in some cases a granularity of the shared exponent portion for each of the parameters of the parameter tensor may be dynamically reconfigurable. For example, in cases where the parameters of the DNN are relatively more sparse, the shared exponent portion may be relative smaller (e.g., less granular), as more data can be used to encode each parameter's private exponent portion without increasing the total data used by the system. In cases where less storage is available, the shared exponent portion may be relatively larger (e.g., more granular), which can result in data savings while reducing the precision with which each parameter's overall exponent value is encoded.

In some cases, the private exponent portion may affect how a given parameter is quantized. For example, some parameters in a tensor may include private exponent portions equal to a shared_exponent-scale-1 (e.g., e.g., shared_exponent-2 when scale=1) Shared_exponent refers to the shared exponent portion, while shared_exponent-scale refers to the maximum difference allowed between shared_exponent and a selected exponent within a sub-tile. Rather than mapping parameters where the private exponent portion is equal to shared_exponent-scale-1 to zeros via the sparsity mask, such parameters may instead be mapped to a non-zero representation (e.g., "00" preceded by an implied bit "1," representing "1.00"). Such parameters may then be denoted as non-zero in the sparsity mask.

Figure 8:
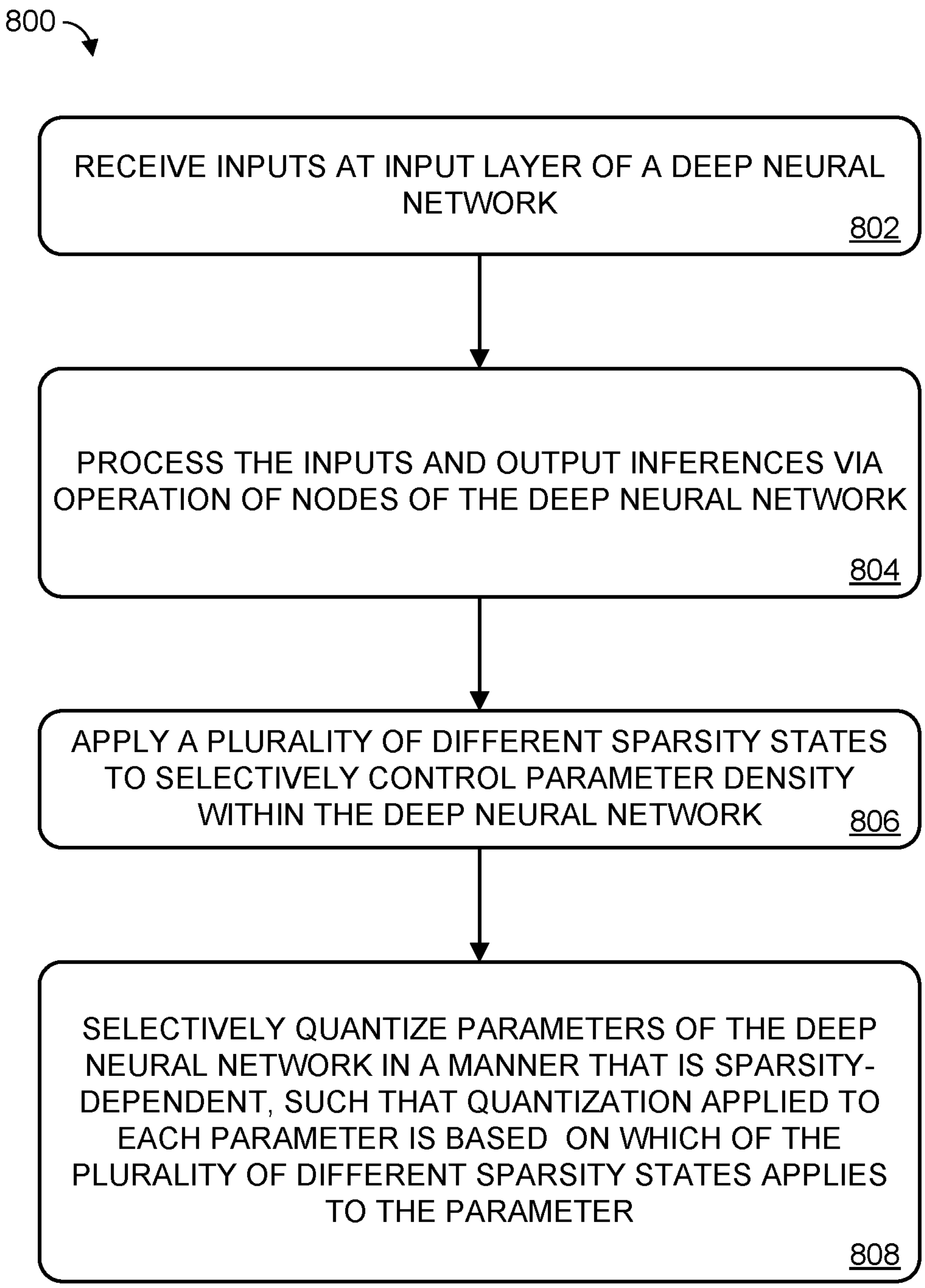
FIG. 8 illustrates an example method of operating a deep neural network.

FIG. 8 illustrates an example method 800 for selectively quantizing parameters of a deep neural network. Method 800 may be implemented by any suitable computing system of one or more computing devices. Any computing device that performs steps of method 800 may have any suitable capabilities, hardware configuration, and form factor. In some cases, method 800 may be implemented by computing system 1000 described below with respect to FIG. 10.

At 802, method 800 includes receiving inputs at an input layer of the deep neural network. At 804, method 800 includes, via operation of nodes within the input, output, and hidden layers, processing the inputs and outputting inferences from the output layer over a plurality of inference passes. This may be done substantially as described above with respect to FIGS. 1 and 2. It will be understood that the deep neural network may be configured to receive any suitable type of data as an input, and apply any suitable operations to the input data to generate an output, depending on the implementation.

At 806, method 800 includes, during the plurality of inference passes, applying a plurality of different sparsity states to selectively control parameter density within the deep neural network. This may be done substantially as described above with respect to FIGS. 4 and 5. For example, a sparsity controller may change the percentage of parameters of the DNN that are sparse—e.g., in a first sparsity state, 50% of parameters are sparse, while in a second sparsity state, 75% of parameters are sparse. As another example, with respect to a single parameter, a first sparsity state may cause sparsification of the parameter, while a second sparsity state does not cause sparsification of the parameter. In general, sparsity may be applied to parameters of a DNN in any number of suitable ways.

At 808, method 800 includes, during one or more of the inference passes, selectively quantizing parameters of the deep neural network in a manner that is sparsity-dependent. In other words, quantization applied to each parameter may be based on which of the plurality of different sparsity states applies to the parameter. For instance, as described above, selectively quantizing parameters may include making a mantissa bit determination that differs between a first sparsity state and a second sparsity state. This may include inferring the leading bit of the mantissa to be one value (e.g., 1) for non-sparse parameters, and inferring the leading bit of the mantissa to be a different value (e.g., 0) for sparse parameters.

Figure 9:
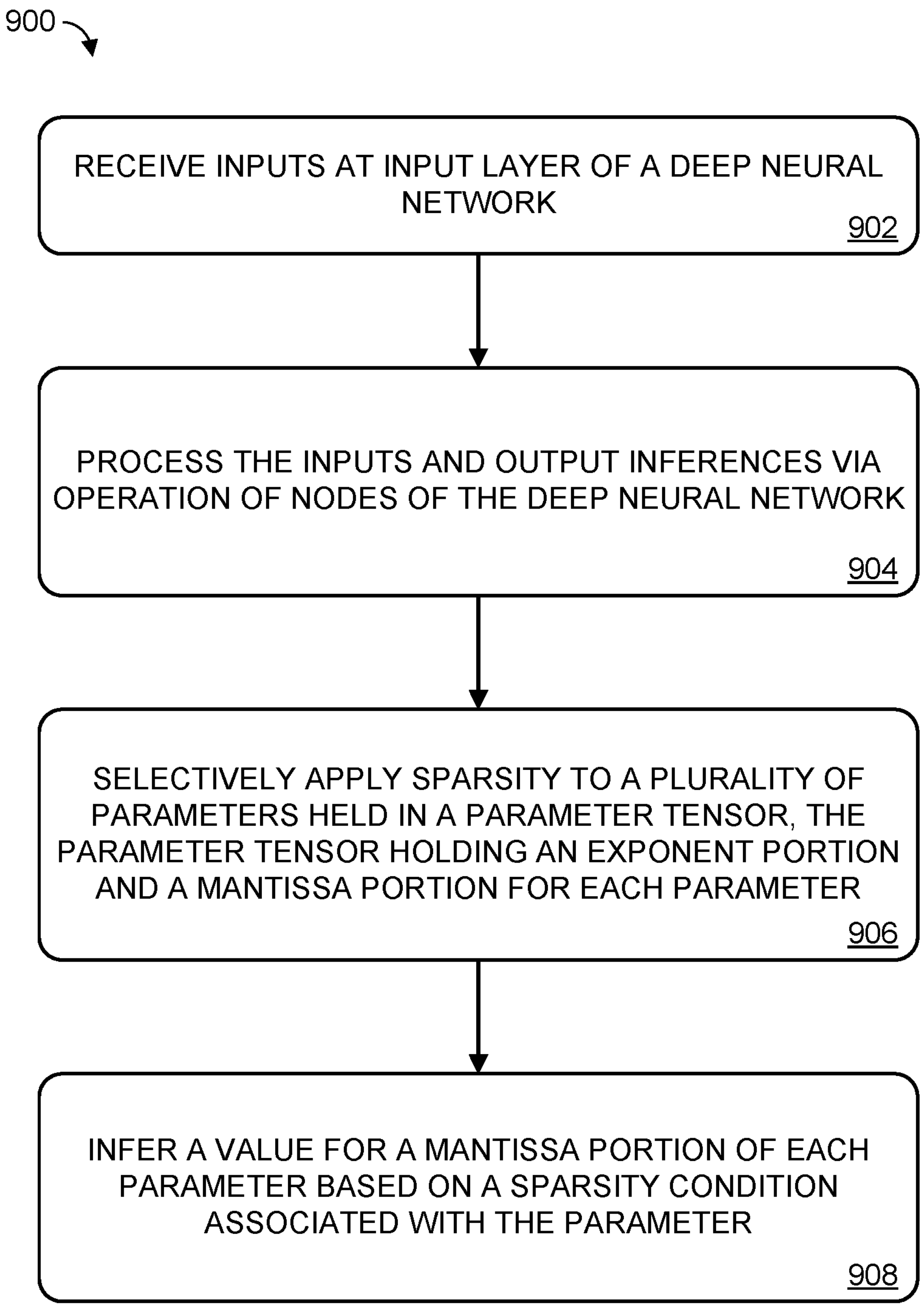
FIG. 9 illustrates another example method of operating a deep neural network.

FIG. 9 illustrates another example method 900 for selectively applying sparsity to parameters of a deep neural network. As with method 800, method 900 may be implemented by any suitable computing system of one or more computing devices. Any computing devices performing steps of method 900 may have any suitable capabilities, hardware configuration, and form factor. In some cases, method 900 may be implemented by computing system 1000 described below with respect to FIG. 10.

At 902, method 900 includes receiving inputs at an input layer of the deep neural network. At 904, method 900 includes, via operation of nodes within the input, output, and hidden layers, processing the inputs and outputting inferences from the output layer over a plurality of inference passes. This may be done substantially as described above with respect to FIGS. 1 and 2. It will be understood that the deep neural network may be configured to receive any suitable type of data as an input, and apply any suitable operations to the input data to generate an output, depending on the implementation.

At 906, method 900 includes, during the plurality of inference passes, selectively applying sparsity to a plurality of parameters held in a parameter tensor of the deep neural network. As discussed above, this can include sparsifying some parameters and not others, sparsifying some parameters differently from others, changing the overall percentage of parameters in the DNN that are sparse, etc. Furthermore, as discussed above, the parameter tensor may hold an exponent portion and a mantissa portion for at least some stored parameters.

At 908, method 900 includes, during the plurality of inference passes, inferring a value for a mantissa portion of each parameter in the parameter tensor based on a sparsity condition associated with the parameter. In other words, as described above, selectively quantizing parameters may include making a mantissa bit determination that differs between a first sparsity state and a second sparsity state. This may include inferring the leading bit of the mantissa to be one value (e.g., 1) for non-sparse parameters, and inferring the leading bit of the mantissa to be a different value (e.g., 0) for sparse parameters.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 10:
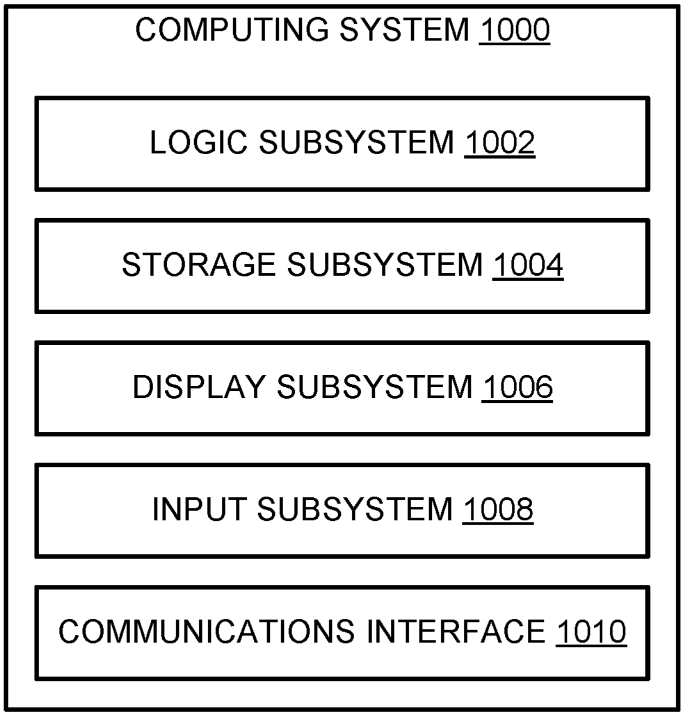
FIG. 10 schematically shows an example computing system.

FIG. 10 schematically shows a simplified representation of a computing system 1000 configured to provide any to all of the compute functionality described herein. Computing system 1000 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1000 includes a logic subsystem 1002 and a storage subsystem 1004. Computing system 1000 may optionally include a display subsystem 1006, input subsystem 1008, communication subsystem 1010, and/or other subsystems not shown in FIG. 10.

Logic subsystem 1002 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1004 includes one or more physical devices configured to temporarily and/or permanently hold computer information such as data and instructions executable by the logic subsystem. When the storage subsystem includes two or more devices, the devices may be collocated and/or remotely located. Storage subsystem 1004 may include volatile, nonvolatile, dynamic, static, read/write, read-only, random-access, sequential-access, location-addressable, file-addressable, and/or content-addressable devices. Storage subsystem 1004 may include removable and/or built-in devices. When the logic subsystem executes instructions, the state of storage subsystem 1004 may be transformed—e.g., to hold different data.

Aspects of logic subsystem 1002 and storage subsystem 1004 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 1006 may be used to present a visual representation of data held by storage subsystem 1004. This visual representation may take the form of a graphical user interface (GUI). Display subsystem 1006 may include one or more display devices utilizing virtually any type of technology. In some implementations, display subsystem may include one or more virtual-, augmented-, or mixed reality displays.

When included, input subsystem 1008 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1010 may be configured to communicatively couple computing system 1000 with one or more other computing devices. Communication subsystem 1010 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data may only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible, anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components may be trained on diverse, representative datasets that include sufficient relevant data for diverse users and/or populations of users. In particular, training data sets may be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a computing system is configured to implement a deep neural network, the deep neural network comprising: an input layer for receiving inputs applied to the deep neural network; an output layer for outputting inferences based on the received inputs; a plurality of hidden layers interposed between the input layer and the output layer; a plurality of nodes disposed within and interconnecting the input layer, output layer, and hidden layers, wherein the nodes selectively operate on the inputs to generate and cause outputting of the inferences, and wherein operation of the nodes is controlled based on parameters of the deep neural network; a sparsity controller configured to selectively apply a plurality of different sparsity states to control parameter density of the deep neural network; and a quantization controller configured to selectively quantize the parameters of the deep neural network in a manner that is sparsity-dependent, such that quantization applied to each parameter is based on which of the plurality of different sparsity states applies to the parameter. In this example or any other example, wherein for a parameter tensor of the deep neural network, a first sparsity state and a second sparsity state of the plurality of different sparsity states differ relative to a percentage of parameters that are sparsified in the parameter tensor. In this example or any other example, wherein for a parameter of the deep neural network, a first sparsity state of the plurality of different sparsity states causes sparsification of the parameter, and a second sparsity state of the plurality of different sparsity states does not cause sparsification of the parameter. In this example or any other example, selectively quantizing the parameter of the deep neural network decreases a number of bits used to express the parameter if it is sparsified. In this example or any other example, selectively quantizing the parameters of the deep neural network includes a mantissa bit determination that differs between a first sparsity state and a second sparsity state of the plurality of different sparsity states. In this example or any other example, at least some of the parameters of the deep neural network are stored in a parameter tensor, the parameter tensor including separate exponent values for each of the parameters of the tensor. In this example or any other example, at least some of the parameters of the deep neural network are stored in a parameter tensor, the parameter tensor including (1) a mantissa portion for each parameter of the tensor, (2) a private exponent portion for each parameter of the tensor, and (3) a shared exponent portion, wherein the shared exponent portion is common to each of the parameters and is not replicated in storage for each of the parameters, and wherein the private exponent portion and shared exponent portion collectively specify an exponent value for the respective parameter. In this example or any other example, a granularity of the shared exponent portion for each of the parameters of the parameter tensor is dynamically reconfigurable. In this example or any other example, the quantization controller is configured to selectively infer at least some of the mantissa portion for a parameter based on whether a sparsity state or a second sparsity state of the plurality of different sparsity states applies to the parameter. In this example or any other example, inferring at least some of the mantissa portion includes discarding a leading bit of the mantissa portion, and inferring the leading bit based on whether the first sparsity state or the second sparsity state applies to the parameter.

In an example, a method of operating a deep neural network having an input layer, an output layer, a plurality of interposed hidden layers, and a plurality of nodes disposed within and interconnecting said input, output, and hidden layers, the method comprising: receiving inputs at the input layer; via operation of nodes within the input, output, and hidden layers, processing the inputs and outputting inferences from the output layer over a plurality of inference passes; during the plurality of inference passes, applying a plurality of different sparsity states to selectively control parameter density within the deep neural network; and during one or more of the inference passes, selectively quantizing parameters of the deep neural network in a manner that is sparsity-dependent, such that quantization applied to each parameter is based on which of the plurality of different sparsity states applies to the parameter. In this example or any other example, selectively quantizing parameters of the deep neural network entails a mantissa bit determination that differs between a first sparsity state and a second sparsity state of the plurality of different sparsity states. In this example or any other example, at least some of the parameters of the deep neural network are stored in a parameter tensor, the parameter tensor including (1) a mantissa portion for each parameter of the tensor, (2) a private exponent portion for each parameter of the tensor, and (3) a shared exponent portion, wherein the shared exponent portion is common to each of the parameters and is not replicated in storage for each of the parameters, and wherein the private exponent portion and shared exponent portion collectively specify an exponent value for the respective parameter. In this example or any other example, the method further comprises selectively inferring at least some of the mantissa portion for a parameter based on whether a first sparsity state or a second sparsity state of the plurality of different sparsity states applies to the parameter. In this example or any other example, inferring at least some of the mantissa portion includes discarding a leading bit of the mantissa portion, and inferring the leading bit based on whether the first sparsity state or the second sparsity state applies to the parameter.

In an example, a method of operating a deep neural network having an input layer, an output layer, a plurality of interposed hidden layers, and a plurality of nodes disposed within and interconnecting said input, output, and hidden layers, the method comprising: receiving inputs at the input layer; via operation of nodes within the input, hidden, and output layers, processing the inputs and outputting inferences from the output layer over a plurality of inference passes; during the plurality of inference passes, selectively applying sparsity to a plurality of parameters held in a parameter tensor of the deep neural network, wherein for each parameter, the parameter tensor holds an exponent portion and a mantissa portion; and during the plurality of inference passes, inferring a value for a mantissa portion of each parameter in the parameter tensor based on a sparsity condition associated with the parameter. In this example or any other example, inferring the value for the mantissa portion of each parameter includes inferring a leading bit of the mantissa portion based on whether the parameter is sparsified. In this example or any other example, inferring the leading bit of the mantissa portion includes inferring the leading bit to be a zero value if the parameter is sparse. In this example or any other example, the parameter tensor includes a shared exponent portion common to each of the parameters in the parameter tensor, and wherein the exponent portion for each of the parameters in the parameter tensor is a non-shared exponent portion that is useable together with the shared exponent portion to collectively specify an exponent value for parameter. In this example or any other example, a granularity of the shared exponent portion for each of the parameters of the parameter tensor is dynamically reconfigurable.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:

a logic subsystem of one or more logic devices;

a storage subsystem of one or more storage devices having instructions stored thereon executable by the one or more logic devices of the logic subsystem to implement a deep neural network that includes:

an input layer for receiving inputs applied to the deep neural network;

an output layer for outputting inferences based on the received inputs;

a plurality of hidden layers interposed between the input layer and the output layer;

a plurality of nodes disposed within and interconnecting the input layer, output layer, and hidden layers, wherein the nodes selectively operate on the inputs to generate and cause outputting of the inferences, and wherein operation of the nodes is controlled based on a set of parameters of the deep neural network;

a sparsity controller configured to selectively apply a plurality of different sparsity states to parameter tensors of the deep neural network to control parameter density of the set of parameters within the parameter tensors, wherein each sparsity state differs from one or more other sparsity states of the plurality of different sparsity states with respect to a proportion of the set of parameters that are sparsified within each parameter tensor of the deep neural network to which that sparsity state is applied by the sparsity controller; and a quantization controller configured to selectively quantize the set of parameters of the deep neural network in a manner that is sparsity-dependent, such that a degree of quantization applied by the quantization controller to at least one or more non-sparsified parameters of the set of parameters within a parameter tensor of the deep neural network is based on which of the plurality of different sparsity states is applied by the sparsity controller to that parameter tensor;

wherein for each of the parameter tensors to which a sparsity state of the plurality of different sparsity states is applied by the sparsity controller, the degree of quantization applied by the quantization controller to the one or more non-sparsified parameters of that parameter tensor is inversely proportional to the proportion of the set of parameters that are sparsified within that parameter tensor; and wherein for each non-sparsified parameter that is quantized by the quantization controller, the degree of quantization defines a magnitude of a reduction in a quantity of bits that encode that non-sparsified parameter within memory of the computing system.

2. The computing system of claim 1, wherein for a first sparsity state and a second sparsity state of the plurality of different sparsity states:

each parameter tensor of the deep neural network to which the first sparsity state is applied has a greater percentage of parameters of the set of parameters that are sparsified within that parameter tensor, and each parameter tensor of the deep neural network to which the second sparsity state is applied has a lesser percentage of parameters of the set of parameters that are sparsified within that parameter tensor; and wherein the degree of quantization applied to the one or more non-sparsified parameters within each parameter tensor of the deep neural network to which the first sparsity state is applied is lesser than the degree of quantization applied to the one or more non-sparsified parameters within each parameter tensor of the deep neural network to which the second sparsity state is applied.

3. The computing system of claim 1, wherein for a parameter of the set of parameters of the deep neural network, a first sparsity state of the plurality of different sparsity states causes sparsification of the parameter within one or more of the parameter tensors of the deep neural network, and a second sparsity state of the plurality of different sparsity states does not cause sparsification of the parameter within the one or more of the parameter tensors of the deep neural network.

4. The computing system of claim 1, wherein selectively quantizing the set of parameters of the deep neural network includes a mantissa bit determination that differs between a first sparsity state and a second sparsity state of the plurality of different sparsity states.

5. The computing system of claim 1, wherein at least some of the set of parameters of the deep neural network are stored in each parameter tensor of the deep neural network, and wherein at least some of the parameter tensors of the deep neural network include separate exponent values for each of the parameters of the parameter tensor.

6. The computing system of claim 1, wherein at least some of the set of parameters of the deep neural network are stored in a parameter tensor of the deep neural network as: (1) a mantissa portion for each parameter of the parameter tensor, (2) a private exponent portion for each parameter of the parameter tensor, and (3) a shared exponent portion, wherein the shared exponent portion is common to each of the parameters of the parameter tensor and is not replicated in storage for each of the parameters, and wherein the private exponent portion and shared exponent portion collectively specify an exponent value for a respective parameter of the parameter tensor.

7. The computing system of claim 6, wherein a granularity of the shared exponent portion of the parameter tensor is dynamically reconfigurable.

8. The computing system of claim 6, wherein the quantization controller is configured to selectively infer at least some of the mantissa portion for a parameter of the set of parameters within a parameter tensor of the deep neural network based on whether a first sparsity state or a second sparsity state of the plurality of different sparsity states applies to the parameter.

9. The computing system of claim 8, wherein inferring at least some of the mantissa portion includes inferring a leading bit previously discarded by quantization based on whether the first sparsity state or the second sparsity state applies to the parameter.

10. The computing system of claim 1, wherein for each non-sparsified parameter that is quantized, at least a leading bit of a mantissa portion of that non-sparsified parameter is discarded.

11. The computing system of claim 1, wherein for a first sparsity state of the plurality of different sparsity states, a first percentage of parameters are sparsified in a first parameter tensor to which the first sparsity state is applied, and a first degree of quantization is applied to non-sparsified parameters in the first parameter tensor; and wherein for a second sparsity state of the plurality of different sparsity states, a second percentage of parameters, greater than the first percentage, are sparsified in a second parameter tensor to which the second sparsity state is applied, and a second degree of quantization, less than the first degree of quantization, is applied to non-sparsified parameters in the second parameter tensor, such that the non-sparsified parameters in the second parameter tensor are represented with more overall bits of data as compared to the non-sparsified parameters in the first parameter tensor.

12. A method of operating a deep neural network having an input layer, an output layer, a plurality of interposed hidden layers, and a plurality of nodes disposed within and interconnecting said input, output, and hidden layers, the method comprising, on a computing system:

receiving inputs at the input layer;

via operation of nodes within the input, output, and hidden layers, processing the inputs and outputting inferences from the output layer over a plurality of inference passes;

during the plurality of inference passes, applying a plurality of different sparsity states to parameter tensors of the deep neural network to selectively control parameter density of a set of parameters within the deep neural network, wherein each sparsity state differs from one or more other sparsity states of the plurality of different sparsity states with respect to a proportion of the set of parameters that are sparsified within each parameter tensor of the deep neural network to which that sparsity state is applied; and during one or more of the inference passes, selectively quantizing the set of parameters of the deep neural network in a manner that is sparsity-dependent, such that a degree of quantization applied to at least one or more non-sparsified parameters of the set of parameters within a parameter tensor of the deep neural network is based on which of the plurality of different sparsity states is applied to that parameter tensor;

wherein for each of the parameter tensors to which a sparsity state of the plurality of different sparsity states is applied, the degree of quantization applied to the one or more non-sparsified parameters of that parameter tensor is inversely proportional to the proportion of the set of parameters that are sparsified within that parameter tensor; and wherein for each non-sparsified parameter that is quantized, the degree of quantization defines a magnitude of a reduction in a quantity of bits that encode that non-sparsified parameter within memory of the computing system.

13. The method of claim 12, wherein selectively quantizing the set of parameters of the deep neural network entails a mantissa bit determination that differs between a first sparsity state and a second sparsity state of the plurality of different sparsity states.

14. The method of claim 12, wherein at least some of the set of parameters of the deep neural network are stored in a parameter tensor of the deep neural network as: (1) a mantissa portion for each parameter of the parameter tensor, (2) a private exponent portion for each parameter of the parameter tensor, and (3) a shared exponent portion, wherein the shared exponent portion is common to each of the parameters of the parameter tensor and is not replicated in storage for each of the parameters, and wherein the private exponent portion and shared exponent portion collectively specify an exponent value for a respective parameter of the parameter tensor.

15. The method of claim 14, further comprising selectively inferring at least some of the mantissa portion for a parameter of the set of parameters within a parameter tensor of the deep neural network based on whether a first sparsity state or a second sparsity state of the plurality of different sparsity states applies to the parameter.

16. The method of claim 15, wherein inferring at least some of the mantissa portion includes inferring a leading bit previously discarded by quantization based on whether the first sparsity state or the second sparsity state applies to the parameter.

17. A method of operating a deep neural network having an input layer, an output layer, a plurality of interposed hidden layers, and a plurality of nodes disposed within and interconnecting said input, output, and hidden layers, the method comprising, on a computing system:

receiving inputs at the input layer;

via operation of nodes within the input, hidden, and output layers, processing the inputs and outputting inferences from the output layer over a plurality of inference passes;

during the plurality of inference passes, selectively applying a plurality of different sparsity states to parameter tensors of the deep neural network to selectively control parameter density of a set of parameters within the deep neural network, wherein each sparsity state differs from one or more other sparsity states of the plurality of different sparsity states with respect to a proportion of the set of parameters that are sparsified within each parameter tensor of the deep neural network to which that sparsity state is applied, and wherein each parameter tensor holds an exponent portion and a mantissa portion for at least some of the set of parameters of the parameter tensor;

during the plurality of inference passes, inferring a value for the mantissa portion of a parameter of the set of parameters within a parameter tensor of the deep neural network based on whether a first sparsity state or a second sparsity state of the plurality of different sparsity states applies to the parameter tensor;

during one or more of the inference passes, selectively quantizing the set of parameters of the deep neural network in a manner that is sparsity-dependent, such that a degree of quantization applied to at least one or more non-sparsified parameters of the set of parameters within a parameter tensor of the deep neural network is based on which of the plurality of different sparsity states is applied to that parameter tensor;

wherein for each of the parameter tensors to which a sparsity state of the plurality of different sparsity states is applied, the degree of quantization applied to the one or more non-sparsified parameters of that parameter tensor is inversely proportional to the proportion of the set of parameters that are sparsified within that parameter tensor; and wherein for each non-sparsified parameter that is quantized, the degree of quantization defines a magnitude of a reduction in a quantity of bits that encode that non-sparsified parameter within memory of the computing system.

18. The method of claim 17, wherein inferring the value for the mantissa portion of the parameter includes inferring a leading bit of the mantissa portion based on whether the parameter is sparsified.

19. The method of claim 18, wherein inferring the leading bit of the mantissa portion includes inferring the leading bit to be a zero value if the parameter is sparsified.

20. The method of claim 17, wherein at least some of the parameter tensors of the deep neural network include a shared exponent portion common to each of the parameters in the parameter tensor, and wherein the exponent portion for each of the parameters in the parameter tensor is a non-shared exponent portion that is useable together with the shared exponent portion to collectively specify an exponent value for the parameter.

* * * * *